United States Patent

Murphy

Patent Number: 5,521,015
Date of Patent: May 28, 1996

[54] METAL MATRIX COMPOSITE COMPONENT

[76] Inventor: Martin J. M. Murphy, Lane Edge Cottage, Hoggeston Near Winslow, Buckinghamshire MK18 3LL, United Kingdom

[21] Appl. No.: 350,191

[22] Filed: Dec. 5, 1994

Related U.S. Application Data

[63] Continuation of Ser. No. 29,846, filed as PCT/GB91/01577, Sep. 13, 1991, published as WO92/05292, Apr. 2, 1992, abandoned.

[30] Foreign Application Priority Data

Sep. 14, 1990 [GB] United Kingdom .................. 9020182
Jul. 19, 1991 [GB] United Kingdom .................. 9115663

[51] Int. Cl.⁶ .................. B22F 5/08; B22F 5/00
[52] U.S. Cl. .................. 428/545; 428/546; 428/552; 428/565; 428/614
[58] Field of Search .................. 428/545, 546, 428/552, 565, 614

[56] References Cited

U.S. PATENT DOCUMENTS

| | | | |
|---|---|---|---|
| 4,290,510 | 9/1981 | Warren | 188/218 X |
| 5,028,494 | 7/1991 | Tsujimura et al. | 428/614 |
| 5,224,572 | 7/1993 | Smolen, Jr. et al. | 188/218 X |

*Primary Examiner*—Donald P. Walsh
*Assistant Examiner*—John N. Greaves
*Attorney, Agent, or Firm*—Caesar, Rivise, Bernstein, Cohen, & Pokotilow, Ltd.

[57] ABSTRACT

A metal matrix composite component e.g. a brake disc, is provided with a protective coating to prevent displacement of the reinforcing filler in the matrix when the component is placed under load. Preferably the protective coating is metal, alloy, composite, refractory or ceramic applied e.g. by electro-plating.

5 Claims, 1 Drawing Sheet

METAL MATRIX COMPOSITE COMPONENT

This application is a continuation, of PCT/GB91/01577 filed Sep. 13, 1991, published as WO92/05292, Apr. 2, 1992, and application Ser. No. 08/029,846, filed Mar. 11, 1993, now abandoned.

The invention relates to a component formed of a metal matrix composite i.e. a continuous metal phase reinforced with a disperse phase which may or may not be metal. The matrix may be formed of a metal such as aluminium, magnesium, titaninm or an alloy based on any of these; the disperse phase may be in particulate, fibre or whisker form and selected from a wide range of materials such as silicon carbide, boron carbide, alumina, carbon, sand and other refractory fillers; wires of steel, copper or silver; and the like. A typical metal matrix composite comprises from about 10% to 40% by volume cf silicon carbide in a continuous phase of an alloy of aluminium/magnesium/silicon or aluminium/copper or aluminium/lithium. Composites are of value because of lightness in weight coupled with strength and stiffness properties which are exerted even at high temperatures. Such composites can be made by a wide variety of techniques.

It has been observed that under certain conditions a component made of such a composite can fail to perform its intended function properly. In a specific case, a brake disc made of such a material will fail because of the frictional engagement with known brake pads. The reasons for this are not clear but there is evidence to suggest that dispersed particles of the second material in the composite are displaced from their position in the matrix. There would be value in using a reliable brake disc made of a metal matrix composite because of the lightness in weight, strength, stiffness, wear resistance and like properties.

Disc brakes comprising a caliper and a disc have been widely adopted, particularly for automotive applications. The disc is squeezed during braking between pads of friction material, mounted in the caliper; and since the disc has a high resistance to compression, and since much of the disc is exposed and so can cool more quickly than for instance the drum of a drum brake, a disc brake is less prone than the drum brake to brake "fade" i.e. to partial loss of braking at high disc and/or pad temperatures, as may occur following intensive brake usage over a short period. It will also be of advantage to form other components of this material able to withstand similar conditions of use. Such components can be parts used in automotive, aerospace, aeronautic, machine tool, construction and like equipment.

It is one object of this invention to provide a component formed of a metal matrix composite, which component is able to withstand stresses induced in use. e.g. applied frictional forces.

According to the invention in one aspect there is provided a component formed of a metal matrix composite, the component having a protective coating on at least one surface thereof characterised in that the protective coating is selected to prevent displacement of the reinforcing filler or other disperse phase in the matrix when the component is placed under load.

As indicated, one particular component is a brake disc which in use can be damaged by a brake pad and in this case the protective coating is selected to protect 6he surface against an applied abrasive force. In addition or alternatively the coating may be selected to provide corrosion resistance, hardness, wear resistance, compatability or other properties. Depending on the intended use, the coating may be selected to have thermal properties, e.g. conductivity.

Most preferably, the protective coating is applied by electroplating, plasma deposition, magnetron sputtering or a like technique.

The protective coating may be selected from a wide variety of materials. The coating is usually a metal e.g. Fe, Al, Zn, Cu, Co, Cr, W, In or alloy or a composite. One example is preferably cast iron and another is a composite based on high carbon iron, molybdenum and aluminium. The coating may be non-metallic, e.g. refractory or ceramic, e.g. alumina. Re-inforcing fibres e.g. silicon carbide, carbon may be present. The material selected will be chosen to be compatible with the component, e.g. for a brake disc it will have a rate of linear heat expansion substantially the same as that of the composite to avoid the risk of debonding at service temperature. The coating will usually be thin say about 0.2 millimeters.

The metal matrix composite may be selected from any of the available such materials. The density may range from about 2.5 to about 3.1 $gm/cm^3$, dependant on the materials selected.

In another aspect the invention provides a method of making a component as defined, comprising applying a protective coating to an least one surface of a component formed of a metal matrix composite characterised in that the coating is applied to a depth of about 0.2 millimeters.

Preferably the coating is ceramic.

A brake disc of the invention can be used with a wide range of available brake pads without undergoing damage in use. As a result commercially available brake pads can be used without modification. The discs may be used at the front and/or rear of a vehicle, including a racing vehicle.

The invention will be further described by way of example with reference to the accompanying diagrammatic drawing in which.

The vehicle brake disc 10 is of generally "top-hat" form, with a mounting bell portion 11 adapted to be secured to rotate with a vehicle wheel; in an alternative embodiment the disc can be mounted to rotate with the vehicle propshaft and may be ventilated. The bell and disc are held together in known manner, e.g. by bolts and nuts, not shown.

Friction pads A,B are movable into engagement with opposed side faces 10a, 10b of disc 10, to effect braking of the disc. During such engagement if the disc is rotating, high temperatures are generated at the disc surfaces, which may have therefore a frictionally induced surface temperature exceeding 400° C.

Figure 1:
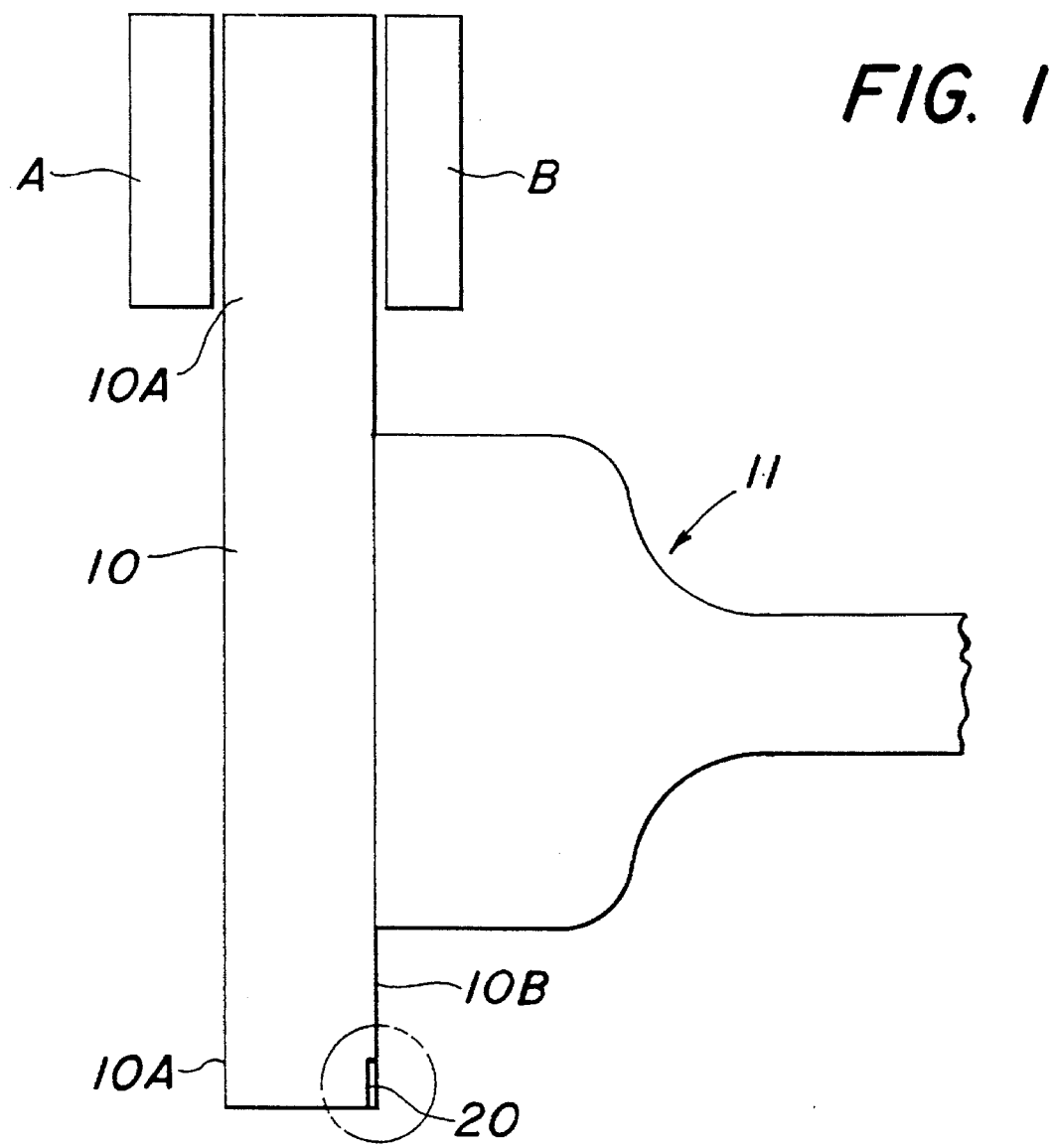
FIG. 1 is a cross-sectional view of a typical disc for use in a disc brake.
Figure 2:
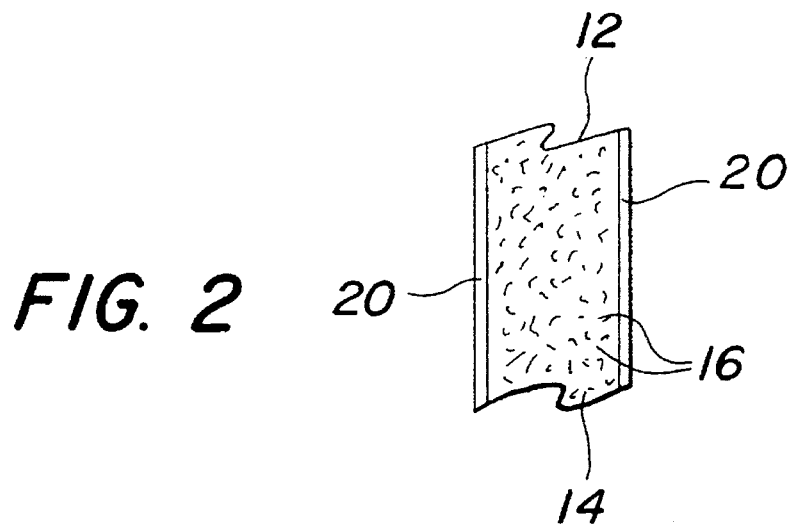
FIG. 2 is an enlarged section of a circled disc portion of FIG. 1.

The disc comprises a body portion 12, formed of a metal matrix composite with a coating 20 of cast iron applied by a plasma spray technique. METCO 449 is one commercially available sprayable material. As shown in FIG. 2, disc 10 is of an aluminium alloy body 14 with particulate silicon carbide 16 therein, randomly but evenly distributed. The density of the matrix is about 2.76 $gm/cm^3$. The plasma sprayed coating 20 is applied to a depth sufficient to protect the underlying metal matrix composite, typically about 0.2 millimetre, and so as to prevent any particles 16 standing proud of the surface from contacting the pad A,B in use and causing damage thereto.

I claim:

1. A racing car brake disc comprising a metal matrix composite, the composite comprising a continuous metal phase containing dispersed therein particles of reinforcing filler, the component having a protective coating on at least one surface thereof, the protective coating being selected to prevent displacement of the reinforcing filler in the matrix when tile component is placed under load, the protective coating having been applied to a thickness of about 0.2 millimeters.

2. The racing car brake disc of claim 1 wherein the protective coating is a ceramic.

3. The racing car brake disc of claim 2 wherein the protective coating comprises alumina.

4. The racing car brake disc of claim 1 including opposed faces wherein the protective coating is appiied to each of the opposed faces.

5. A racing car brake assembly comprising a set of brake pads and a brake disc, the brake disc being formed of a metal matrix composite, the composite comprising a continuous metal phase containing dispersed therein particles of reinforcing filler, the component having a protective coating on at least one surface thereof, the protective coating being selected to prevent displacement of the reinforcing filler in the matrix when the component is placed under load, the protective coating having been applied to a thickness of about 0.2 millimeters.

* * * * *